(12) United States Patent
Mignogna et al.

(10) Patent No.: US 10,654,946 B2
(45) Date of Patent: May 19, 2020

(54) CATALYST COMPONENTS FOR THE POLYMERIZATION OF OLEFINS

(71) Applicant: BASELL POLIOLEFINE ITALIA S.R.L., Milan (IT)

(72) Inventors: Alessandro Mignogna, Ferrara (IT); Dario Liguori, Ferrara (IT); Giampiero Morini, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 0 days.

(21) Appl. No.: 16/462,014

(22) PCT Filed: Nov. 10, 2017

(86) PCT No.: PCT/EP2017/078934
§ 371 (c)(1),
(2) Date: May 17, 2019

(87) PCT Pub. No.: WO2018/091375
PCT Pub. Date: May 24, 2018

(65) Prior Publication Data
US 2019/0330388 A1    Oct. 31, 2019

(30) Foreign Application Priority Data

Nov. 18, 2016  (EP) .................................... 16199501

(51) Int. Cl.
| | | |
|---|---|---|
| *C08F 4/654* | (2006.01) | |
| *C08F 110/06* | (2006.01) | |
| *C08F 4/651* | (2006.01) | |
| *C08F 4/659* | (2006.01) | |

(52) U.S. Cl.
CPC .............. *C08F 4/654* (2013.01); *C08F 4/651* (2013.01); *C08F 4/65912* (2013.01); *C08F 110/06* (2013.01)

(58) Field of Classification Search
None
See application file for complete search history.

(56) References Cited

FOREIGN PATENT DOCUMENTS

| WO | 2006/110234 A2 | 10/2006 |
| WO | 2016/142334 A1 | 9/2016 |

OTHER PUBLICATIONS

International Search Report and Writtion Opinion dated Feb. 15, 2018 (Feb. 15, 2018) for Corresponding PCT/EP2017/078934.

*Primary Examiner* — Catherine S Branch

(57) ABSTRACT

A solid catalyst component for the polymerization of olefins made from or containing Mg, Ti and an electron donor of formula (I)

$$R^1O-C(=O)-N(R^2)-C(R^3)(R^4)-C(R^5)(R^6)-C(=O)-OR^7 \quad (I)$$

wherein $R^1$ and $R^7$ groups, equal to or different from each other, are selected from $C_1$-$C_{15}$ hydrocarbon groups, $R^2$ group is selected from $C_1$-$C_{10}$ hydrocarbon groups, and $R^3$ to $R^6$ groups, independently, are selected from hydrogen or $C_1$-$C_{15}$ hydrocarbon groups which can be fused together to form one or more cycles.
The catalyst system based on the solid catalyst component is endowed with high activity and stereospecificity.

15 Claims, No Drawings

CATALYST COMPONENTS FOR THE POLYMERIZATION OF OLEFINS

This application is the U.S. National Phase of PCT International Application PCT/EP2017/078934, filed November 10, 2017, claiming benefit of priority to European Patent Application No. 16199501.4, filed November 18, 2016, the contents of which are incorporated herein by reference in its entirety.

FIELD OF THE INVENTION

In general, the present disclosure relates to the field of chemistry. More specifically, the present disclosure relates to polymer chemistry. In particular, the present disclosure relates to catalyst components for the polymerization of olefins, made from or containing a Mg dihalide based support on which are supported Ti atoms and an electron donor compound containing an ester and a carbamate function.

BACKGROUND OF THE INVENTION

Some catalyst components are useful for the stereospecific polymerization of olefins. In some instances, the polymerization of propylene uses Ziegler-Natta catalysts made from or containing a solid catalyst component, constituted by a magnesium dihalide on which are supported a titanium compound and an internal electron donor compound, used in combination with an Al-alkyl compound. In some instances, the preparation of higher crystallinity of the polymer also involves the use of an external donor, thereby obtaining higher isotacticity. An alkoxysilane can act as an external donor. In some instances, esters of phthalic acid are used as internal donors in catalyst preparations. In some instances, phthalates are used as internal donors in combination with alkylalkoxysilanes as external donor. This catalyst system gives good performances in terms of activity, isotacticity and xylene insolubility.

SUMMARY OF THE INVENTION

The present disclosure provides a solid catalyst component for the polymerization of olefins made from or containing Mg, Ti and an electron donor of formula (I)

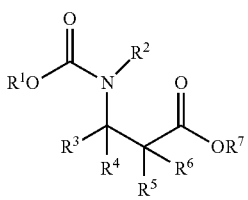

(I)

wherein $R^1$ and $R^7$ groups, equal to or different from each other, are selected from $C_1$-$C_{15}$ hydrocarbon groups, $R^2$ group is selected from $C_1$-$C_{10}$ hydrocarbon groups, and $R^3$ to $R^6$ groups, independently, are selected from hydrogen or $C_1$-$C_{15}$ hydrocarbon groups which can be fused together to form one or more cycles.

DETAILED DESCRIPTION OF THE INVENTION

In some embodiments and in addition to carbon and hydrogen, the hydrocarbon groups $R^1$ to $R^7$ is selected from the group consisting of a heteroatom selected from halogen, P, S, N, O and Si.

In some embodiments, $R^1$ is a $C_1$-$C_{10}$ alkyl group, alternatively a $C_1$-$C_8$ alkyl group. In some embodiments, the alkyl group is a primary alkyl group.

In some embodiments, $R^2$ is selected from $C_1$-$C_{10}$ alkyl groups, alternatively $C_3$-$C_{10}$ alkyl groups, alternatively $C_3$-$C_{10}$ linear alkyl groups.

In some embodiments, $R^3$ is selected from $C_1$-$C_{10}$ alkyl group, alternatively $C_1$-$C_8$ alkyl groups, alternatively linear $C_1$-$C_8$ alkyl groups. In some embodiments, $R^3$ groups are selected from $C_1$-$C_3$ linear alkyl groups when $R^2$ groups are selected from $C_3$-$C_{10}$ linear alkyl groups.

In some embodiments, $R^4$ is a hydrogen or a $C_1$-$C_{10}$ alkyl group. In some embodiments, $R^4$ is hydrogen.

In some embodiments, $R^3$ is selected from $C_1$-$C_{10}$ alkyl group and $R^4$ is hydrogen.

In some embodiments, $R^5$ and $R^6$ are hydrogen or a $C_1$-$C_{10}$ alkyl group, alternatively both $R^5$ and $R^6$ are hydrogen.

In some embodiments, $R^7$ is a $C_1$-$C_{10}$ alkyl group, alternatively a $C_1$-$C_8$ alkyl group. In some embodiments, the alkyl group is a primary alkyl group.

In some embodiments, $R^1$ and $R^7$ are independently a $C_1$-$C_{10}$ alkyl group, $R^2$ is selected from $C_3$-$C_{10}$ linear alkyl groups, $R^3$ is selected from linear $C_1$-$C_8$ alkyl groups and $R^4$ to $R^6$ are hydrogen.

In some embodiments, the final amount of electron donor compound in the solid catalyst component ranges from 1 to 25% by weight, alternatively from 3 to 20% by weight.

In some embodiments, the structures of formula (I) are selected from the group consisting of ethyl 3-((ethoxycarbonyl)(ethyl)amino)butanoate, ethyl 3-((ethoxycarbonyl)(isobutyl)amino)butanoate, ethyl 3-((ethoxycarbonyl)(isopropyl)amino)butanoate, ethyl 3-((ethoxycarbonyl)(methyl)amino)butanoate, ethyl 3-((ethoxycarbonyl)(phenyl)amino)butanoate, ethyl 3-((ethoxycarbonyl)(propyl)amino)butanoate, ethyl 3-(tert-butyl(ethoxycarbonyl)amino)butanoate, ethyl 3-(butyl(ethoxycarbonyl)amino)butanoate, ethyl 3-(cyclohexyl(ethoxycarbonyl)amino)butanoate, ethyl 3-((ethoxycarbonyl)(ethyl)amino)-2-methylbutanoate, ethyl 3-((ethoxycarbonyl)(isobutyl)amino)-2-methylbutanoate, ethyl 3-((ethoxycarbonyl)(isopropyl)amino)-2-methylbutanoate, ethyl 3-((ethoxycarbonyl)(methyl)amino)-2-methylbutanoate, ethyl 3-((ethoxycarbonyl)(phenyl)amino)-2-methylbutanoate, ethyl 3-((ethoxycarbonyl)(propyl)amino)-2-methylbutanoate, ethyl 3-(tert-butyl(ethoxycarbonyl)amino)-2-methylbutanoate, ethyl 3-(butyl(ethoxycarbonyl)amino)-2-methylbutanoate, ethyl 3-(cyclohexyl(ethoxycarbonyl)amino)-2-methylbutanoate, ethyl 3-((ethoxycarbonyl)(ethyl)amino)-3-phenylpropanoate, ethyl 3-((ethoxycarbonyl)(ethyl)amino)-4,4-dimethylpentanoate, ethyl 3-((ethoxycarbonyl)(ethyl)amino)-4-methylpentanoate, ethyl 3-((ethoxycarbonyl)(ethyl)amino)-5-methylhexanoate, ethyl 3-((ethoxycarbonyl)(ethyl)amino)heptanoate, ethyl 3-((ethoxycarbonyl)(ethyl)amino)hexanoate, ethyl 3-((ethoxycarbonyl)(ethyl)amino)pentanoate, ethyl 3-((ethoxycarbonyl)(isobutyl)amino)-3-phenylpropanoate, ethyl 3-((ethoxycarbonyl)(isobutyl)amino)-4,4-dimethylpentanoate, ethyl 3-((ethoxycarbonyl)(isobutyl)amino)-4-methylpentanoate, ethyl 3-((ethoxycarbonyl)(isobutyl)amino)-5-methylhexanoate, ethyl 3-((ethoxycarbonyl)(isobutyl)amino)heptanoate, ethyl 3-((ethoxycarbonyl)(isobutyl)amino)hexanoate, ethyl 3-((ethoxycarbonyl)(isobutyl)amino)pentanoate, ethyl 3-((ethoxycarbonyl)(isopropyl)amino)-3-phenylpropanoate, ethyl 3-((ethoxycarbonyl)(isopropyl)amino)-4,4-dimethylpentanoate, ethyl 3-((ethoxycarbonyl)(isopropyl)amino)-4-methylpentanoate, ethyl 3-((ethoxycarbonyl)(isopropyl)

amino)-5-methylhexanoate, ethyl 3-((ethoxycarbonyl)(isopropyl)amino)heptanoate, ethyl 3-((ethoxycarbonyl)(isopropyl)amino)hexanoate, ethyl 3-((ethoxycarbonyl)(isopropyl)amino)pentanoate, ethyl 3-((ethoxycarbonyl)(methyl)amino)-3-phenylpropanoate, ethyl 3-((ethoxycarbonyl)(methyl)amino)-4,4-dimethylpentanoate, ethyl 3-((ethoxycarbonyl)(methyl)amino)-4-methylpentanoate, ethyl 3-((ethoxycarbonyl)(methyl)amino)-5-methylhexanoate, ethyl 3-((ethoxycarbonyl)(methyl)amino)heptanoate, ethyl 3-((ethoxycarbonyl)(methyl)amino)hexanoate, ethyl 3-((ethoxycarbonyl)(methyl)amino)pentanoate, ethyl 3-((ethoxycarbonyl)(phenyl)amino)-3-phenylpropanoate, ethyl 3-((ethoxycarbonyl)(phenyl)amino)-4,4-dimethylpentanoate, ethyl 3-((ethoxycarbonyl)(phenyl)amino)-4-methylpentanoate, ethyl 3-((ethoxycarbonyl)(phenyl)amino)-5-methylhexanoate, ethyl 3-((ethoxycarbonyl)(phenyl)amino)heptanoate, ethyl 3-((ethoxycarbonyl)(phenyl)amino)hexanoate, ethyl 3-((ethoxycarbonyl)(phenyl)amino)pentanoate, ethyl 3-((ethoxycarbonyl)(propyl)amino)-3-phenylpropanoate, ethyl 3-((ethoxycarbonyl)(propyl)amino)-4,4-dimethylpentanoate, ethyl 3-((ethoxycarbonyl)(propyl)amino)-4-methylpentanoate, ethyl 3-((ethoxycarbonyl)(propyl)amino)-5-methyl hexanoate, ethyl 3-((ethoxycarbonyl)(propyl)amino)heptanoate, ethyl 3-((ethoxycarbonyl)(propyl)amino)hexanoate, ethyl 3-((ethoxycarbonyl)(propyl)amino)pentanoate, ethyl 3-(tert-butyl(ethoxycarbonyl)amino)-3-cyclohexylpropanoate, ethyl 3-(tert-butyl(ethoxycarbonyl)amino)-3-phenylpropanoate, ethyl 3-(tert-butyl(ethoxycarbonyl)amino)-4,4-dimethylpentanoate, ethyl 3-(tert-butyl(ethoxycarbonyl)amino)-4-methylpentanoate, ethyl 3-(tert-butyl(ethoxycarbonyl)amino)-5-methyl hexanoate, ethyl 3-(tert-butyl(ethoxycarbonyl)amino)heptanoate, ethyl 3-(tert-butyl(ethoxycarbonyl)amino)hexanoate, ethyl 3-(tert-butyl(ethoxycarbonyl)amino)pentanoate, ethyl 3-(butyl(ethoxycarbonyl)amino)-3-cyclohexylpropanoate, ethyl 3-(butyl(ethoxycarbonyl)amino)-3-phenylpropanoate, ethyl 3-(butyl(ethoxycarbonyl)amino)-4,4-dimethylpentanoate, ethyl 3-(butyl(ethoxycarbonyl)amino)-4-methylpentanoate, ethyl 3-(butyl(ethoxycarbonyl)amino)-5-methylhexanoate, ethyl 3-(butyl(ethoxycarbonyl)amino)heptanoate, ethyl 3-(butyl(ethoxycarbonyl)amino)hexanoate, ethyl 3-(butyl(ethoxycarbonyl)amino)pentanoate, ethyl 3-(cyclohexyl(ethoxycarbonyl)amino)-3-phenylpropanoate, ethyl 3-(cyclohexyl(ethoxycarbonyl)amino)-4,4-dimethylpentanoate, ethyl 3-(cyclohexyl(ethoxycarbonyl)amino)-4-methylpentanoate, ethyl 3-(cyclohexyl(ethoxycarbonyl)amino)-5-methylhexanoate, ethyl 3-(cyclohexyl(ethoxycarbonyl)amino)heptanoate, ethyl 3-(cyclohexyl(ethoxycarbonyl)amino)hexanoate, ethyl 3-(cyclohexyl(ethoxycarbonyl)amino)pentanoate, ethyl 3-cyclohexyl-3-((ethoxycarbonyl)(ethyl)amino)propanoate, ethyl 3-cyclohexyl-3-((ethoxycarbonyl)(isobutyl)amino)propanoate, ethyl 3-cyclohexyl-3-((ethoxycarbonyl)(isopropyl)amino)propanoate, ethyl 3-cyclohexyl-3-((ethoxycarbonyl)(methyl)amino)propanoate, ethyl 3-cyclohexyl-3-((ethoxycarbonyl)(phenyl)amino)propanoate, ethyl 3-cyclohexyl-3-((ethoxycarbonyl)(propyl)amino)propanoate, ethyl 3-cyclohexyl-3-(cyclohexyl(ethoxycarbonyl)amino)propanoate, propyl 3-((ethoxycarbonyl)(ethyl)amino)butanoate, propyl 3-((ethoxycarbonyl)(isobutyl)amino)butanoate, propyl 3-((ethoxycarbonyl)(isopropyl)amino)butanoate, propyl 3-((ethoxycarbonyl)(methyl)amino)butanoate, propyl 3-((ethoxycarbonyl)(phenyl)amino)butanoate, propyl 3-((ethoxycarbonyl)(propyl)amino)butanoate, propyl 3-(tert-butyl(ethoxycarbonyl)amino)butanoate, propyl 3-(butyl(ethoxycarbonyl)amino)butanoate, propyl 3-(cyclohexyl(ethoxycarbonyl)amino)butanoate, butyl 3-((ethoxycarbonyl)(ethyl)amino)butanoate, butyl 3-((ethoxycarbonyl)(isobutyl)amino)butanoate, butyl 3-((ethoxycarbonyl)(isopropyl)amino)butanoate, butyl 3-((ethoxycarbonyl)(methyl)amino)butanoate, butyl 3-((ethoxycarbonyl)(phenyl)amino)butanoate, butyl 3-(butyl(ethoxycarbonyl)amino)butanoate, butyl 3-(cyclohexyl(ethoxycarbonyl)amino)butanoate, isobutyl 3-((ethoxycarbonyl)(ethyl)amino)butanoate, isobutyl 3-((ethoxycarbonyl)(isobutyl)amino)butanoate, isobutyl 3-((ethoxycarbonyl)(isopropyl)amino)butanoate, isobutyl 3-((ethoxycarbonyl)(methyl)amino)butanoate, isobutyl 3-((ethoxycarbonyl)(phenyl)amino)butanoate, isobutyl 3-(butyl(ethoxycarbonyl)amino)butanoate, isobutyl 3-(cyclohexyl(ethoxycarbonyl)amino)butanoate, ethyl 2-((ethoxycarbonyl)(ethyl)amino)cyclopentane-1-carboxylate, ethyl 2-((ethoxycarbonyl)(isobutyl)amino)cyclopentane-1-carboxylate, ethyl 2-((ethoxycarbonyl)(isopropyl)amino)cyclopentane-1-carboxylate, ethyl 2-((ethoxycarbonyl)(methyl)amino)cyclopentane-1-carboxylate, ethyl 2-((ethoxycarbonyl)(phenyl)amino)cyclopentane-1-carboxylate, ethyl 2-(butyl(ethoxycarbonyl)amino)cyclopentane-1-carboxylate, ethyl 2-((ethoxycarbonyl)(ethyl)amino)cyclohexane-1-carboxylate, ethyl 2-((ethoxycarbonyl)(isobutyl)amino)cyclohexane-1-carboxylate, ethyl 2-((ethoxycarbonyl)(isopropyl)amino)cyclohexane-1-carboxylate, ethyl 2-((ethoxycarbonyl)(methyl)amino)cyclohexane-1-carboxylate, ethyl 2-((ethoxycarbonyl)(phenyl)amino)cyclohexane-1-carboxylate, ethyl 2-(butyl(ethoxycarbonyl)amino)cyclohexane-1-carboxylate, ethyl 3-(((benzyloxy)carbonyl)(butyl)amino)butanoate, ethyl 3-(((benzyloxy)carbonyl)(methyl)amino)butanoate, ethyl 3-((tert-butoxycarbonyl)(butyl)amino)butanoate, ethyl 3-((tert-butoxycarbonyl)(methyl)amino)butanoate, ethyl 3-((butoxycarbonyl)(butyl)amino)butanoate, ethyl 3-((butoxycarbonyl)(methyl)amino)butanoate, ethyl 3-((isobutoxycarbonyl)(methyl)amino)butanoate, ethyl 3-((isopropoxycarbonyl)(methyl)amino)butanoate, ethyl 3-((methoxycarbonyl)(methyl)amino)butanoate, ethyl 3-(butyl(isobutoxycarbonyl)amino)butanoate, ethyl 3-(butyl(isopropoxycarbonyl)amino)butanoate, ethyl 3-(butyl(methoxycarbonyl)amino)butanoate, ethyl 3-(butyl(phenoxycarbonyl)amino)butanoate, and ethyl 3-(methyl(phenoxy carbonyl)amino)butanoate.

In some embodiments, the compounds falling in formula (I) are prepared by using one of the following synthetic routes.

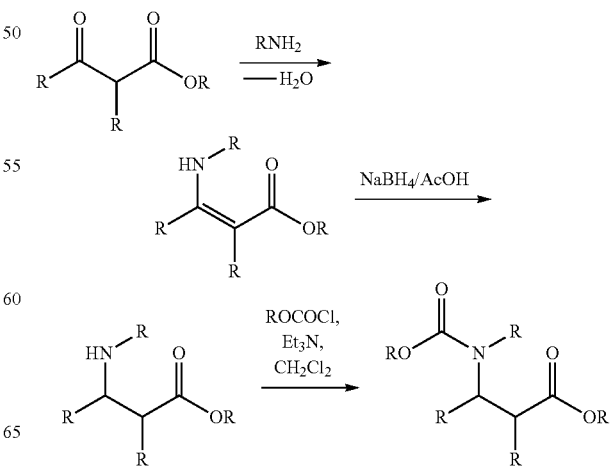

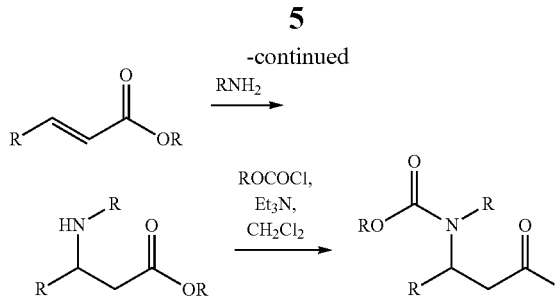

In some embodiments and in the solid catalyst component, the amount of Ti atoms is higher than 2.5% wt, alternatively higher than 3.0%, with respect to the total weight of the catalyst component.

The catalyst components are made from or contain, in addition to the above electron donors, Ti, Mg and halogen. In some embodiments, the catalyst components are made from or contain a titanium compound, having at least a Ti-halogen bond and the electron donor compounds supported on a Mg halide. In some embodiments, the magnesium halide is $MgCl_2$ in active form. In some embodiments, the magnesium dihalides in active form used as support or co-support in components of catalysts for the polymerization of olefins are characterized by X-ray spectra in which the most intense diffraction line that appears in the spectrum of the non-active halide is diminished in intensity and is replaced by a halo whose maximum intensity is displaced towards lower angles relative to that of the more intense line.

In some embodiments, the titanium compounds used in the catalyst component are selected from $TiCl_4$ and $TiCl_3$. In some embodiments, the titanium compounds are Ti-haloalcoholates of formula $Ti(OR^7)_{m-y}$, where m is the valence of titanium, y is a number between 1 and m−1, X is halogen and $R^7$ is a hydrocarbon radical having from 1 to 10 carbon atoms.

In some embodiments, the solid catalyst component is prepared in any of several methods. In some embodiments, the method includes the reaction between magnesium alcoholates or chloroalcoholates and an excess of $TiCl_4$ in the presence of the electron donor compounds at a temperature of about 80 to 120° C. In some embodiments, the chloroalcoholates are prepared as described in U.S. Pat. No. 4,220,554.

In some embodiments, the solid catalyst component is prepared by reacting a titanium compound of formula $Ti(OR^7)_{m-y}$, where m is the valence of titanium and y is a number between 1 and m with a magnesium chloride deriving from an adduct of formula $MgCl_2 \cdot pR^8OH$, where p is a number between 0.1 and 6, alternatively from 2 to 3.5, and $R^8$ is a hydrocarbon radical having 1-18 carbon atoms. In some embodiments, the titanium compound is $TiCl_4$. In some embodiments, the adduct is prepared in spherical form by mixing alcohol and magnesium chloride in the presence of an inert hydrocarbon immiscible with the adduct, operating under stirring conditions at the melting temperature of the adduct (100-130° C.). Then, the emulsion is quickly quenched, thereby causing the solidification of the adduct in form of spherical particles. In some embodiments, the spherical adducts are as described in U.S. Pat. Nos. 4,399,054 and 4,469,648. In some embodiments, the adduct is directly reacted with Ti compound or subjected to thermal controlled dealcoholation (80-130° C.), thereby obtaining an adduct in which the number of moles of alcohol is lower than 3, alternatively between 0.1 and 2.5. In some embodiments, the reaction with the Ti compound is carried out by suspending the adduct (dealcoholated or as such) in cold $TiCl_4$. In some embodiments, the temperature of the $TiCl_4$ is about 0° C. The mixture is heated up to 80-130° C. and kept at this temperature for 0.5-2 hours. In some embodiments, the treatment with $TiCl_4$ is carried out one or more times. In some embodiments, the electron donor compound is added during the treatment with $TiCl_4$. In some embodiments, the preparation of catalyst components in spherical form is as described in European Patent Applications EP-A-395083, EP-A-553805, EP-A-553806, and EPA601525 and Patent Cooperation Treaty Publication No. WO98/44009.

In some embodiments, the solid catalyst components show a surface area (by B.E.T. method) between 20 and 500 $m^2/g$, alternatively between 50 and 400 $m^2/g$, and a total porosity (by B.E.T. method) higher than 0.2 $cm^3/g$, alternatively between 0.2 and 0.6 $cm^3/g$. In some embodiments, the porosity (Hg method) due to pores with radius up to 10.000 Å ranges from 0.3 to 1.5 $cm^3/g$, alternatively from 0.45 to 1 $cm^3/g$.

In some embodiments, the solid catalyst component has an average particle size ranging from 5 to 120 μm, alternatively from 10 to 100 μm.

In some embodiments, the electron donor compounds is added as such or, in an alternative way, obtained in situ by using a precursor capable to be transformed in the electron donor compound. In some embodiments, the transformation takes place by chemical reactions.

In some embodiments, the final amount of the electron donor compound of formula (I) is such that the donor compound's molar ratio with respect to the Ti atoms is from 0.01 to 2, alternatively from 0.05 to 1.5.

The solid catalyst components are converted into catalysts for the polymerization of olefins by reacting the solid catalyst components with organoaluminum compounds.

In some embodiments, a catalyst for the polymerization of olefins $CH_2$=CHR, wherein R is hydrogen or a hydrocarbyl radical with 1-12 carbon atoms, made from or containing the product obtained by contacting:
(i) the solid catalyst component and
(ii) an alkylaluminum compound and optionally,
(iii) an external electron donor compound.

In some embodiments, the alkyl-Al compound (ii) is chosen among trialkyl aluminum compounds. In some embodiments, the trialkyl aluminum compounds are selected from the group consisting of triethylaluminum, triisobutylaluminum, tri-n-butylaluminum, tri-n-hexylaluminum, and tri-n-octylaluminum. In some embodiments, the alkyl-Al compound (ii) is selected from the group consisting of alkylaluminum halides, alkylaluminum hydrides and alkylaluminum sesquichlorides. In some embodiments, the alkylaluminum sesquichlorides are selected from the group consisting of $AlEt_2Cl$ and $Al_2Et_3Cl_3$.

In some embodiments, the external electron-donor compounds are selected from the group consisting of silicon compounds, ethers, esters, amines, and heterocyclic compounds.

In some embodiments, the external donor compounds are silicon compounds of formula $(R^8)_a(R^{10})_b Si(OR^{11})_c$, where a and b are integers from 0 to 2, c is an integer from 1 to 4 and the sum (a+b+c) is 4; $R^9$, $R^{10}$, and $R^{11}$, are radicals with 1-18 carbon atoms optionally containing heteroatoms. In some embodiments, the silicon compounds are wherein a is 1, b is 1, c is 2, at least one of $R^9$ and $R^{10}$ is selected from branched alkyl, cycloalkyl or aryl groups with 3-10 carbon atoms optionally containing heteroatoms and $R^{11}$ is a $C_1$-$C_{10}$ alkyl group, alternatively methyl. In some embodiments, the silicon compounds are selected from the group consisting of methylcyclohexyldimethoxysilane (C donor), diphenyldimethoxysilane, methyl-t-butyldimethoxysilane, dicyclopentyldimethoxysilane (D donor), diisopropyldimethoxysilane, (2-ethylpiperidinyl)t-butyldimethoxysilane, (2-ethylpiperidinyl)thexyldimethoxysilane, (3,3,3-trifluoro-n-propyl)(2-ethylpiperidinyl)dimethoxysilane, methyl(3,3,3-trifluoro-n-propyl)dimethoxysilane, and N,N-diethylaminotriethoxysilane. In some embodiments, the silicon compounds are wherein a is 0, c is 3, $R^{10}$ is a branched alkyl or cycloalkyl group, optionally containing heteroatoms, and $R^{11}$ is methyl. In some embodiments, the silicon compounds are selected from the group consisting of cyclohexyltrimethoxysilane, t-butyltrimethoxysilane and thexyltrimethoxysilane.

In some embodiments, the electron donor compound (iii) is used in such an amount to give a molar ratio between the organoaluminum compound and the electron donor compound (iii) of from 0.1 to 500, alternatively from 1 to 300, alternatively from 3 to 100.

In some embodiments, when used in the polymerization of propylene, the catalyst components with an aluminum alkyl compound and an alkyl alkoxysilane produce polypropylene with an activity higher than 35 Kg/gcat, alternatively higher than 40 Kg/gcat, and a xylene insolubility at 25° C. higher than 96%, alternatively higher than 97%.

In some embodiments, the present disclosure provides a process for the homopolymerization or copolymerization of olefins $CH_2=CHR$, wherein R is hydrogen or a hydrocarbyl radical with 1-12 carbon atoms, carried out in the presence of a catalyst made from or containing the product of the reaction between:
(i) the solid catalyst component;
(ii) an alkylaluminum compound and,
(iii) optionally an electron-donor compound (external donor).

In some embodiments, the polymerization process is carried out using various techniques. In some embodiments, the process is slurry polymerization using as diluent an inert hydrocarbon solvent. In some embodiments, the process is bulk polymerization using the liquid monomer as a reaction medium. In some embodiments, the liquid monomer is propylene. In some embodiments, the polymerization process is carried out in gas-phase operating in one or more fluidized or mechanically agitated bed reactors.

In some embodiments, the polymerization is carried out at temperature of from 20 to 120° C., alternatively from 40 to 80° C. In some embodiments, the polymerization is carried out in gas-phase with the operating pressure between 0.5 and 5 MPa, alternatively between 1 and 4 MPa. In some embodiments, the bulk polymerization involves operating pressure between 1 and 8 MPa, alternatively between 1.5 and 5 MPa.

The following examples are given in order to further illustrate the disclosure without being intended as limiting it.

Characterizations

Determination of X.I.

2.5 g of polymer and 250 ml of o-xylene were placed in a round-bottomed flask provided with a cooler and a reflux condenser and maintained under nitrogen. The mixture was heated to 135° C. and maintained under stirring for about 60 minutes. The final solution was allowed to cool to 25° C. under continuous stirring, and the insoluble polymer was then filtered. The filtrate was then evaporated in a nitrogen flow at 140° C. to reach a constant weight. The content of the xylene-soluble fraction is expressed as a percentage of the original 2.5 grams and then, by difference, the X.I. %.

Determination of Donors.

The content of electron donor was carried out via gas-chromatography. The solid component was dissolved in acidic water. The solution was extracted with ethyl acetate, an internal reference was added, and a sample of the organic phase was analyzed in a gas chromatograph, to determine the amount of donor present at the starting catalyst compound.

Melt Flow Rate (MFR)

The melt flow rate MIL of the polymer was determined according to ISO 1133 (230° C., 2.16 Kg).

EXAMPLES

Procedure for Preparation of the Spherical Adduct

An initial amount of microspheroidal $MgCl_2 \cdot 2.8C_2H_5OH$ was prepared according to the method described in Example 2 of Patent Cooperation Treaty Publication No. WO98/44009, but operating on larger scale.

General Procedure for the Polymerization of Propylene

A 4-litre steel autoclave equipped with a stirrer, pressure gauge, thermometer, catalyst feeding system, monomer feeding lines and thermostating jacket, was purged with nitrogen flow at 70° C. for one hour. Then, at 30° C. under propylene flow, the autoclave were charged in sequence with 75 mL of anhydrous hexane, 0.76 g of $AlEt_3$, dicyclopentyl dimethoxysilane as external electron donor to have a Al/Donor molar ratio of 20, and 0.006÷0.010 g of solid catalyst component. The autoclave was closed; subsequently 2.0 NL of hydrogen were added. Then, under stirring, 1.2 kg of liquid propylene was fed. The temperature was raised to 70° C. in five minutes. The polymerization was carried out at 70° C. for two hours. At the end of the polymerization, the non-reacted propylene was removed; the polymer was recovered and dried at 70° C. under vacuum for three hours. Then the polymer was weighed and fractionated with o-xylene to determine the amount of the xylene insoluble (X.I.) fraction.

General Procedure for the Preparation of the Solid Catalyst Component

Into a 500 $cm^3$ round bottom flask, equipped with mechanical stirrer, cooler and thermometer 250 $cm^3$ of $TiCl_4$ were introduced at room temperature under nitrogen atmosphere. After cooling to 0° C., while stirring, the internal donor in Table 1 and 10.0 g of the spherical adduct A were sequentially added into the flask. The amount of charged internal donor was such to charge a Mg/donor molar ratio of 6. The temperature was raised to 100° C. and maintained for 2 hours. Thereafter, stirring was stopped. The solid product was allowed to settle. The supernatant liquid was siphoned off at 100° C. After the supernatant was removed, additional fresh $TiCl_4$ was added to reach the initial liquid volume again. The mixture was then heated at 120° C. and maintained at this temperature for 1 hour. Stirring was stopped again. The solid was allowed to settle. The supernatant liquid was siphoned off. The solid was washed with anhydrous hexane six times (6×100 cm³) in temperature gradient down to 60° C. and one time (100 cm³) at room temperature. The solid was then dried under vacuum. The solid catalyst components were tested in polymerization of propylene, using the procedure described above. The results are listed in Table 1.

Example 1-7 and Comparative Example 1

Preparation of Solid Catalyst Component and Polymerization

The general procedure for the preparation of the solid catalyst component 1 was carried out using the donor reported in Table 1 as internal donor. The solid catalyst components were tested in polymerization of propylene. The results are listed in Table 1.

TABLE 1

| Ex | Catalyst composition Internal Donor Structure/Name | Ti % wt | % wt | Polymerization Activity kg/g | XI % wt | MIL g/10' |
|---|---|---|---|---|---|---|
| 1 | 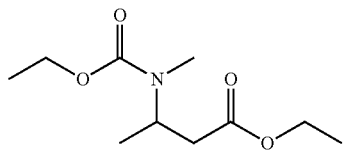 | 7.5 | 3.4 | 37.3 | 96.9 | 4.1 |
| 2 | 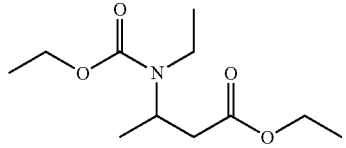 [SMILES: CCOC(=O)CC(C)N(CC)C(=O)OCC] | 6.7 | 3.4 | 36.4 | 96.8 | 7.6 |
| 3 | 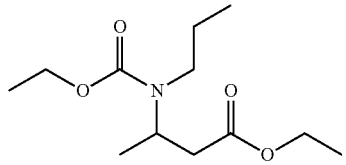 [SMILES: CCCN(C(=O)OCC)C(C)CC(=O)OCC] | 12.3 | 5.0 | 51.0 | 97.6 | 4.6 |
| 4 | 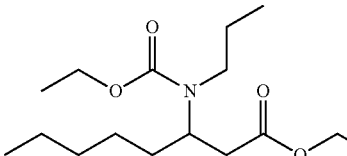 | 13.9 | 3.8 | 45.7 | 96.2 | 5.4 |
| 5 | 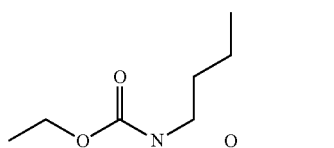 | n.d. | 3.6 | 42.0 | 97.2 | 5.8 |
| 6 | 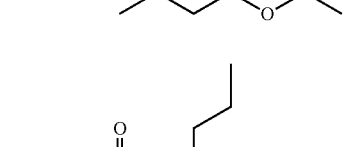 | 11.2 | 3.3 | 49.6 | 96.9 | 4.5 |

TABLE 1-continued

| | Catalyst composition | | | Polymerization | | |
|---|---|---|---|---|---|---|
| | | Internal Donor | Ti | Activity | XI | MIL |
| Ex | Structure/Name | % wt | % wt | kg/g | % wt | g/10' |
| 7 | (structure) | n.d. | 3.8 | 48.5 | 96.3 | 5.0 |
| C1 | 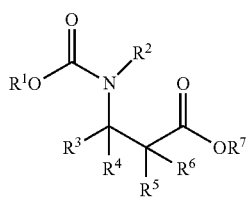 | n.d. | 5.4 | 13.0 | 93.1 | 6.9 | nd: not determined

What is claimed is:

1. A solid catalyst component for the polymerization of olefins comprising:

Mg, Ti and an electron donor of formula (I)

$$\text{(I)}$$

wherein
- $R^1$ and $R^7$ groups, equal to or different from each other, are selected from $C_1$-$C_{15}$ hydrocarbon groups,
- $R^2$ group is selected from $C_1$-$C_{10}$ hydrocarbon groups, and
- $R^3$ to $R^6$ groups, independently, are selected from hydrogen or $C_1$-$C_{15}$ hydrocarbon groups which can be fused together to form one or more cycles.

2. The solid catalyst component according to claim 1, wherein $R^1$ is a $C_1$-$C_{10}$ alkyl group.

3. The solid catalyst component according to claim 1, wherein $R^2$ is selected from $C_1$-$C_{10}$ alkyl groups.

4. The solid catalyst component according to claim 3, wherein $R^2$ is selected from $C_3$-$C_{10}$ alkyl groups.

5. The solid catalyst component according to claim 4, wherein the $C_3$-$C_{10}$ alkyl groups are linear.

6. The solid catalyst component according to claim 1, wherein $R^3$ is selected from $C_1$-$C_{10}$ alkyl groups and $R^4$ is hydrogen.

7. The solid catalyst component according to claim 6, wherein $R^3$ is selected from $C_1$-$C_8$ alkyl groups.

8. The solid catalyst component according to claim 5, wherein $R^3$ is selected from $C_1$-$C_3$ linear alkyl groups.

9. The solid catalyst component according to claim 1, wherein $R^5$ and $R^6$ groups are hydrogen.

10. The solid catalyst component according to claim 1, wherein $R^7$ is a $C_1$-$C_{10}$ alkyl group.

11. The solid catalyst component according to claim 10, wherein $R^7$ is a primary alkyl group.

12. The solid catalyst component according to claim 1, wherein $R^1$ and $R^7$ are independently a $C_1$-$C_{10}$ alkyl group, $R^2$ is selected from $C_3$-$C_{10}$ linear alkyl groups, $R^3$ is selected from linear $C_1$-$C_8$ alkyl groups and $R^4$ to $R^6$ are hydrogen.

13. A catalyst for the polymerization of olefins comprising:
the product of the reaction between:
(i) the solid catalyst component according to claim 1 and
(ii) an alkylaluminum compound.

14. The catalyst according to claim 13 further comprising an external electron donor compound.

15. A process for the homopolymerization or copolymerization of olefins $CH_2=CHR$, wherein R is hydrogen or a hydrocarbyl radical with 1-12 carbon atoms, carried out in the presence of a catalyst system comprising:
the product of the reaction between:
i. the solid catalyst component according to claim 1; and
ii. an alkylaluminum compound.

* * * * *

UNITED STATES PATENT AND TRADEMARK OFFICE
CERTIFICATE OF CORRECTION

PATENT NO. : 10,654,946 B2
APPLICATION NO. : 16/462014
DATED : May 19, 2020
INVENTOR(S) : Galvan et al.

Page 1 of 1

It is certified that error appears in the above-identified patent and that said Letters Patent is hereby corrected as shown below:

On the Title Page

Column 1, Item (30), Line 1, delete "16199501" and insert -- 16199501.4 --, therefor In the Specification In Column 5, Line 34, delete "$Ti(OR^7)_{m-y}$" and insert -- $Ti(OR^7)_{m-y}X_y$ --

In Column 5, Line 48, delete "$Ti(OR^7)_{m-y}$" and insert -- $Ti(OR^7)_{m-y}X_y$ --

Signed and Sealed this
Eighth Day of November, 2022

Katherine Kelly Vidal
*Director of the United States Patent and Trademark Office*